(12) United States Patent
Oh et al.

(10) Patent No.: US 8,137,492 B2
(45) Date of Patent: Mar. 20, 2012

(54) APPARATUS AND METHOD FOR LAMINATING TAPE ON ELECTRODE OF RECHARGEABLE BATTERY

(75) Inventors: Dong Ick Oh, Yongin-si (KR); Taejun Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1106 days.

(21) Appl. No.: 11/411,429

(22) Filed: Apr. 25, 2006

(65) Prior Publication Data

US 2006/0289453 A1 Dec. 28, 2006

(30) Foreign Application Priority Data

Apr. 26, 2005 (KR) .................. 10-2005-0034727

(51) Int. Cl.
*B21B 27/00* (2006.01)
(52) U.S. Cl. .................. 156/64; 219/469; 156/552
(58) Field of Classification Search .................. 219/469
See application file for complete search history.

(56) References Cited

U.S. PATENT DOCUMENTS

| 4,024,038 A * | 5/1977 | Luc .................. 204/168 |
| 6,234,225 B1 * | 5/2001 | Tanaka et al. .................. 156/390 |
| 2002/0007552 A1 * | 1/2002 | Singleton et al. .................. 29/623.3 |
| 2002/0162628 A1 * | 11/2002 | Yamasaki .................. 156/344 |
| 2006/0011288 A1 * | 1/2006 | Watanabe et al. .................. 156/244.11 |

FOREIGN PATENT DOCUMENTS

| KR | 10-2003-0089270 | 11/2003 |
| KR | 10-2005-0032465 | 4/2005 |

* cited by examiner

*Primary Examiner* — Philip Tucker
*Assistant Examiner* — Vicki Wu
(74) *Attorney, Agent, or Firm* — Christie, Parker & Hale, LLP (57) ABSTRACT

An apparatus for laminating tape on an electrode for a rechargeable battery includes a supplying section for supplying an electrode having a current collector with surfaces on which active materials are coated at constant distances from each other. The electrode is wound a plurality of times on the supplying section. The apparatus also includes a first buffering section for carrying the electrode from the supplying section at a constant rate and a laminating section for receiving the electrode from the first buffering section and stopping movement of the electrode for a predetermined time. The laminating section laminates tape on end portions of the active materials after stopping the movement. A feeding section conveys the electrode from the laminating section at a desired pitch. A second buffering section carries the electrode from the feeding section at a predetermined rate and a winding section receives the electrode from the second buffering section.

13 Claims, 6 Drawing Sheets

APPARATUS AND METHOD FOR LAMINATING TAPE ON ELECTRODE OF RECHARGEABLE BATTERY

CROSS-REFERENCE TO RELATED APPLICATION

This application claims priority to and the benefit of Korean Patent Application No. 10-2005-0034727, filed Apr. 26, 2005, the entire content of which is incorporated herein by reference.

BACKGROUND OF THE INVENTION

Generally, in rechargeable batteries such as lithium ion battery and lithium polymer battery, an electrolyte and an electrode assembly are contained together in a can. The electrode assembly includes an anode electrode, a separator, and a cathode electrode. The anode electrode is formed with a foil shaped anode current collector and an anode active material coated on a surface thereof, while the cathode electrode also is formed with a foil shaped cathode current collector and a cathode active material coated on a surface thereof. The current collectors of the electrodes have non-coated portions on which the active material is not coated and to which a conductive tap is usually welded in order to connect the electrode to an exterior circuit.

In order to increase the capacity of the rechargeable battery, the electrode assembly is adapted to have a stronger tension during the winding of the electrode assembly. The stronger the tension is, the larger the area of the electrode assembly which can be wound within the same volume becomes.

However, various problems may occur when the tension of the electrode assembly increases. One of the problems is that the end portion of the active material layer having one polarity, i.e. a sharp end portion of the active material forming a boundary between the non-coated portion of the current collector and the active material, can extend through a separator so as to cause an electric short circuit in an active material layer or on an electrode having the other polarity. The electric short circuiting of the active material or the electrode causes the deterioration of the stability and the reliability of the rechargeable battery.

It is known that the above-mentioned problem frequently occurs in the electrode assembly wound in a cylindrical shape. Specifically, it is believed that the end portion of the active material layer applies stress to any portion on a peripheral surface of a can because the can also has a cylindrical shape in the cylindrical rechargeable battery.

Further, in the rechargeable battery, it has become known that the cathode active material expands somewhat in an initial charging and discharging of the rechargeable battery. Therefore, when the active material expands in the electrode assembly wound with the increased tension as described above, the sharp end portion of the active material layer may extend through the separator so as to cause an electric short circuit in the active material or on the electrode having the opposing polarity.

Moreover, the temperature of the rechargeable battery generally rises during the discharging of the rechargeable battery. Thus, the rigidity of the separator may decrease to allow the end portion of the active material layer to easily cut the separator, thereby causing the electric short circuiting more easily.

SUMMARY OF THE INVENTION

An apparatus for laminating tape on an electrode for a rechargeable battery includes a supplying section for supplying an electrode, the electrode having a current collector with surfaces on which active materials are coated at constant distances from each other, the electrode being wound a plurality of times on the supplying section; a first buffering section for carrying the electrode from the supplying section at a constant rate; a laminating section for receiving the electrode from the first buffering section and stopping movement of the electrode for a predetermined time, the laminating section laminating tape on end portions of the active materials after stopping the movement; a feeding section for conveying the electrode from the laminating section by a desired pitch; a second buffering section for carrying the electrode from the feeding section at a predetermined rate; and a winding section for receiving the electrode from the second buffering section. In one embodiment, the supplying section includes an electric motor and a supplying roller connected by a belt to the electric motor so as to rotate to supply the electrode at the constant rate.

In another embodiment, the first buffering section includes an electric motor; a rotatable conveying roller connected by a belt to the motor for conveying the electrode from the supplying section; and a friction roller which comes into close contact with the conveying roller in order for the electrode to be interposed between the conveying roller and the friction roller, the friction roller rotating along with the conveying roller so as to control a tension of the electrode. This embodiment may further include a supporting roller for supporting the electrode; and an elevating roller for delaying a movement of the electrode, wherein the supporting roller is mounted at a rear portion of the conveying roller, and the elevating roller is mounted between the conveying roller and the supporting roller so as to descend due to its weight during the laminating of the tape in the laminating section and to ascend due to tension of the electrode during the feeding of the electrode in the feeding section.

The laminating section may include a lower tape laminating section for laminating the tape to the end portions of the active materials on a lower surface of the electrode; and an upper tape laminating section for laminating the tape to the end portions of the active materials on an upper surface of the electrode. The lower tape laminating section may further include a supporter disposed at an upper portion of the lower tape laminating section, for supporting the electrode; a pressing element disposed at a lower portion of the lower tape laminating section, for laminating the tape; and a vision portion mounted at a side of the pressing portion, for detecting a position of the end portions of the active materials on a lower surface of the electrode. In another embodiment, the lower tape laminating section includes an electric motor mounted at a lower portion of the lower tape laminating section; a ball screw connected to the electric motor; and a pressing element coupled to the ball screw, so as to control a position of the pressing element.

The upper tape laminating section may include a supporter disposed at a lower portion of the upper tape laminating section, for supporting the electrode; a pressing element disposed at an upper portion of the upper tape laminating section, for laminating the tape; and a vision portion mounted at a side of the pressing element, for detecting a position of the end portions of the active materials. The upper tape laminating section may further include an electric motor mounted at a lower portion of the upper tape laminating section and a ball screw connected to the electric motor and coupled to the supporter, so as to control a position of the supporter.

The feeding section may include an electric motor; a rotatable feeding roller connected by a belt to the electric motor, for feeding the electrode at a desired pitch; and a friction roller in close contact with the feeding roller and having the electrode interposed between the feeding roller and the friction roller. In one embodiment, the feeding section further includes an inspection section mounted at a rear portion of the feeding roller and the friction roller, for examining a position of the tape on the end portions. The inspection section may include a lower camera disposed at a lower portion of the inspection section for inspecting a position of the tape; and an upper camera disposed at an upper portion of the inspection section for inspecting a position of the tape.

The second buffering section may include an electric motor; a rotatable conveying roller connected by a belt to the electric motor, for conveying the electrode; and a friction roller in close contact with the conveying roller and having the electrode interposed between the conveying roller and the friction roller, for controlling the tension of the electrode. In one embodiment, the second buffering section further includes a supporting roller mounted in front of the conveying roller, for supporting the electrode; and an elevating roller mounted between the supporting roller and the conveying roller and ascending due to tension of the electrode during the laminating of the tape in the laminating section and descending due to weight of the elevating roller during the feeding of the electrode in the feeding section.

The winding section may include an electric motor; and a rotatable winding roller connected by a belt to the electric motor, for receiving the electrode from the second buffering section and for winding the electrode thereon.

A method for laminating tape on an electrode for a rechargeable battery, includes providing an electrode, the electrode having a current collector on which active materials are coated at constant distances from each other, the current collector being wound a plurality of times; unwinding the electrode and supplying the electrode to a first buffering section at a substantially constant rate; receiving the electrode from the first buffering section to a laminating section and stopping movement of the electrode through the laminating section for a predetermined time; laminating tape on end portions of the active materials on the electrode while the movement of the electrode through the laminating section is stopped; buffering the electrode in the first buffering section while the movement of the electrode through the laminating section is stopped; feeding the electrode from the laminating section to a feeding section after the predetermined time; buffering the electrode received from the laminating section in a second buffering section to convey the electrode at a desired pitch and at a constant rate to the feeding section; and winding the electrode received from the feeding section.

In one embodiment, the method also includes supporting the electrode in the first buffering section with a supporting roller; delaying a movement of the electrode into the lamination section by allowing an elevating roller in the first buffering section to descend due to weight of the elevating roller while the movement of the electrode through the laminating section is stopped; and allowing a movement of the electrode into the lamination section by allowing the elevating roller in the first buffering section to ascend due to tension of the electrode during the feeding of the electrode in the feeding section.

The laminating may include laminating the tape to the end portions of the active materials on a lower surface of the electrode; and laminating the tape to the end portions of the active materials on an upper surface of the electrode.

In one embodiment, the laminating includes positioning the tape proximate to the end portions of the active materials on the electrode; detecting a position of the tape relative to the end portions; if the detected position is different from a desired position, repositioning the tape proximate to the end portions; and if the detected position is substantially the same as a desired position, laminating the tape to the end portions at the detected position.

In another embodiment, the method further includes inspecting a position of the tape relative to the end portions after the laminating; and if the inspected position is different from a desired position, stopping the movement of the electrode.

BRIEF DESCRIPTION OF THE DRAWINGS

The above and other features and aspects of the present invention will be more apparent from the following detailed description taken in conjunction with the accompanying drawings, in which.

DETAILED DESCRIPTION

Hereinafter, various embodiments of the present invention will be described with reference to the accompanying drawings so that a person skilled in the art can perform the present invention.

Figure 1:
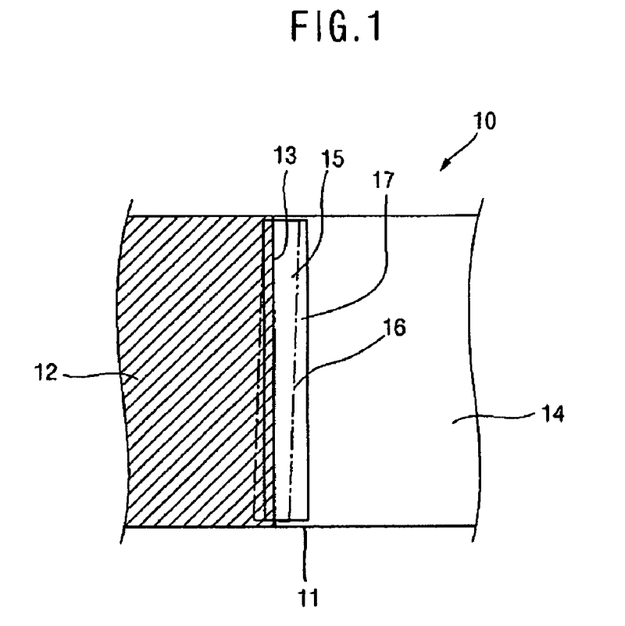
FIG. 1 is a plan view showing an electrode of a rechargeable battery, in which tape is laminated on the electrode of the rechargeable battery.

As shown in FIG. 1, the electrode 10 is formed with a foil shaped current collector 11 for collecting current, and an active material 12 coated at a desired thickness and area on a surface of the current collector 11. An end portion 13 of the active material 12 exists at the boundary between the active material 12 and a non-coated portion 14 on which the active material 12 is not coated. Furthermore, on the electrode 10, a tape 15 having a desired width and length is laminated on an end portion 13 of the active material 12, according to this embodiment of the present invention. The electrode 10 is approved when the tape 15 has been laminated on the end portion 13 of the active material 12 so as to be substantially parallel with the end portion 13, and is disapproved when the tape 15 laminated on the end portion 13 of the active material 12 is not in parallel to the end portion 13 beyond a certain degree. Specifically, the one-dot-chain line 16 in FIG. 1 shows that the tape 15 is laminated while being slightly slanted and away from its reference position 17 on the electrode 10. When the degree of slant of the tape 15 is greater than a certain extent, the electrode 10 is determined to be an inferior product.

Figure 2:
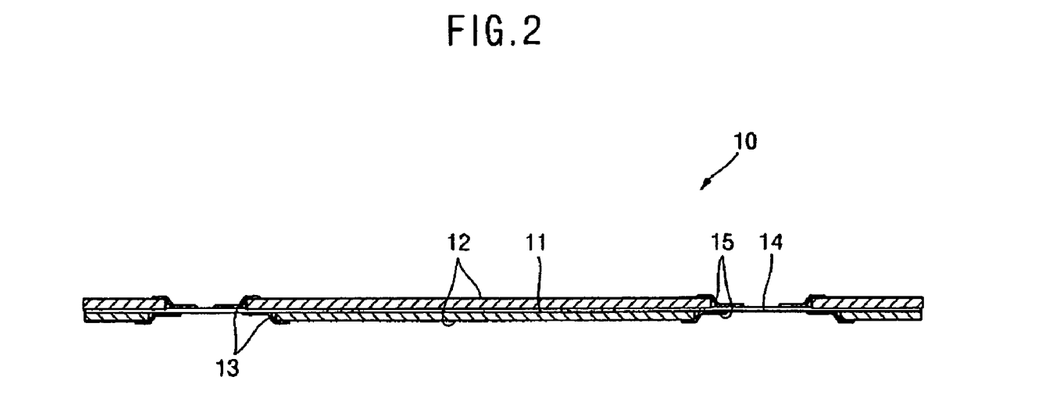
FIG. 2 is a sectional view showing the electrode of the rechargeable battery shown in FIG. 1, in which tape is laminated on the electrode of the rechargeable battery.

As shown in FIG. 2, the active material 12 is coated at a predetermined thickness on upper and lower surfaces of the electrode 10. Further, the active material 12 is coated over a desired area as described above, and the active materials 12 are arranged at a constant distance and pitch from each other. Further, as described above, the tape 15 is laminated on the end portion 13 of each active material 12 coated on the upper and lower surfaces of the electrode 10. Specifically, four pieces of tape 15 are laminated two by two on each of the upper and lower surfaces of the electrode 10. During the assembly of the electrode 10, a tap (not shown) is attached to the non-coated portion 14 of the current collector 11 and the non-coated portions adjacent to both ends of a continuous active material 12 are cut, thereby obtaining one electrode 10. In the present embodiment, the tape 15 is laminated on the end portion 13 of the active material 12 by providing a roll-shaped, wound electrode 10 before the non-coated portions 14 are cut.

Figure 3A:
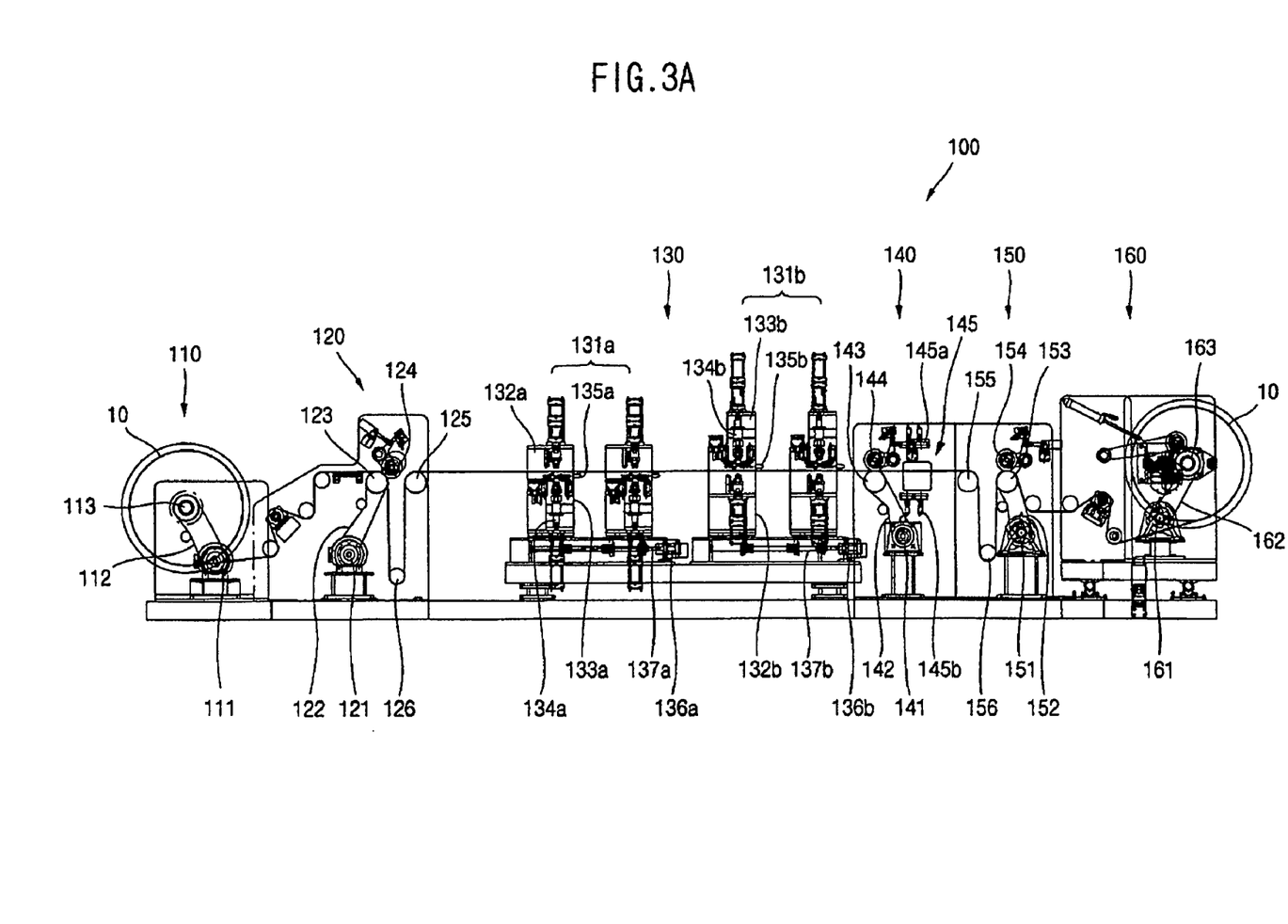
FIGS. 3A and 3B are front and plan views showing an apparatus for laminating tape on an electrode of a rechargeable battery, according to one embodiment of the present invention.
Figure 3B:
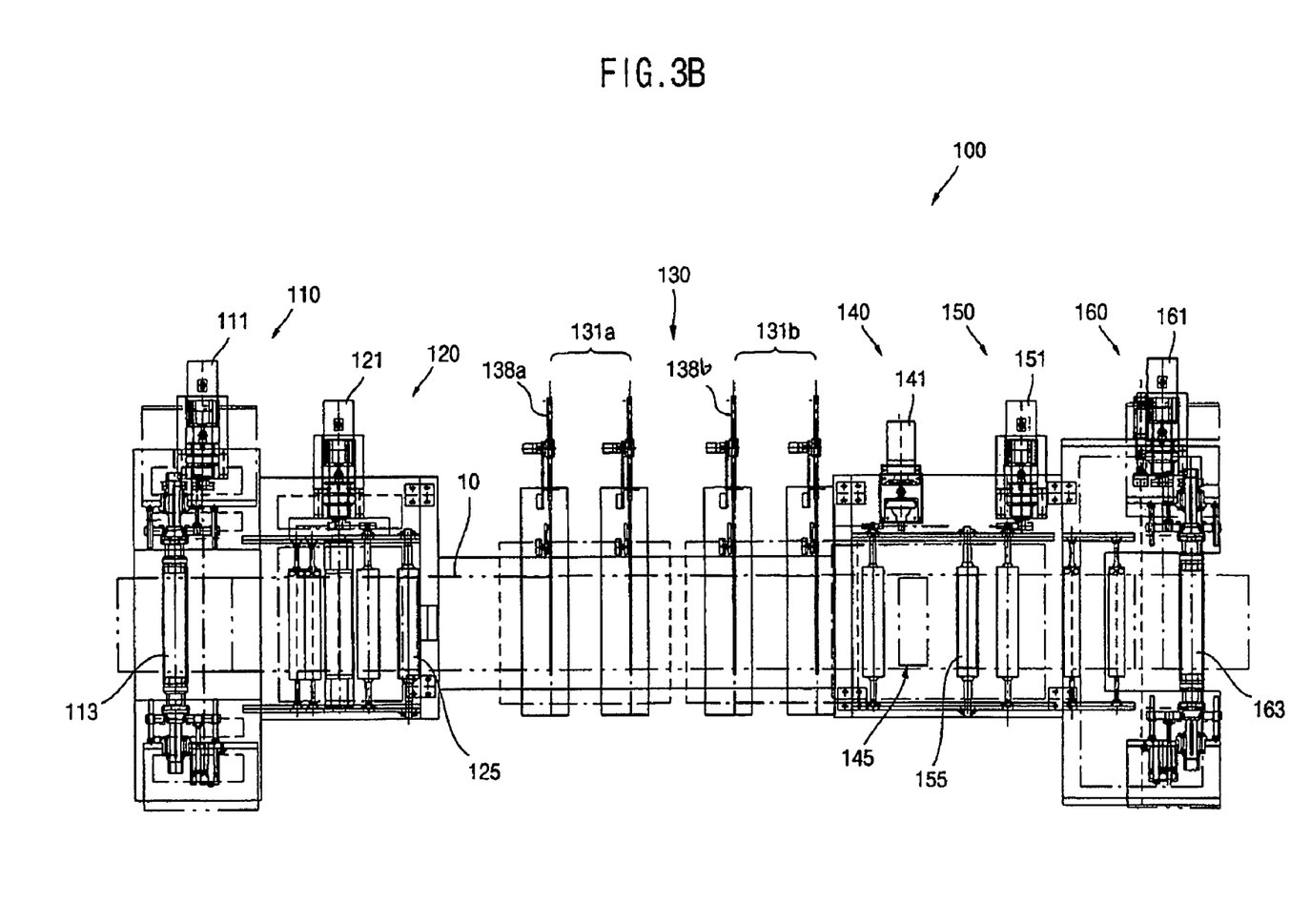

FIGS. 3A and 3B are front and plan views showing an apparatus for laminating the tape on the electrode for the rechargeable battery, according to an embodiment of the present invention.

As shown in FIGS. 3A and 3B, and with reference to FIGS. 1 and 2, the apparatus for laminating the tape on the electrode for the rechargeable battery includes a supplying section 110 for supplying the wound electrode 10 at a constant rate, a first buffering section 120 for buffering the electrode 10 for a predetermined time, a laminating section 130 for laminating the tape 15 on the end portion 13 of the active material 12 of the electrode 10, a feeding section 140 for feeding the electrode 10 laminated with the tape 15 with a desired pitch, a second buffering section 150 for buffering the electrode again for a predetermined time, and a winding section 160 for winding the electrode 10 laminated with the tape 15.

Figure 4:
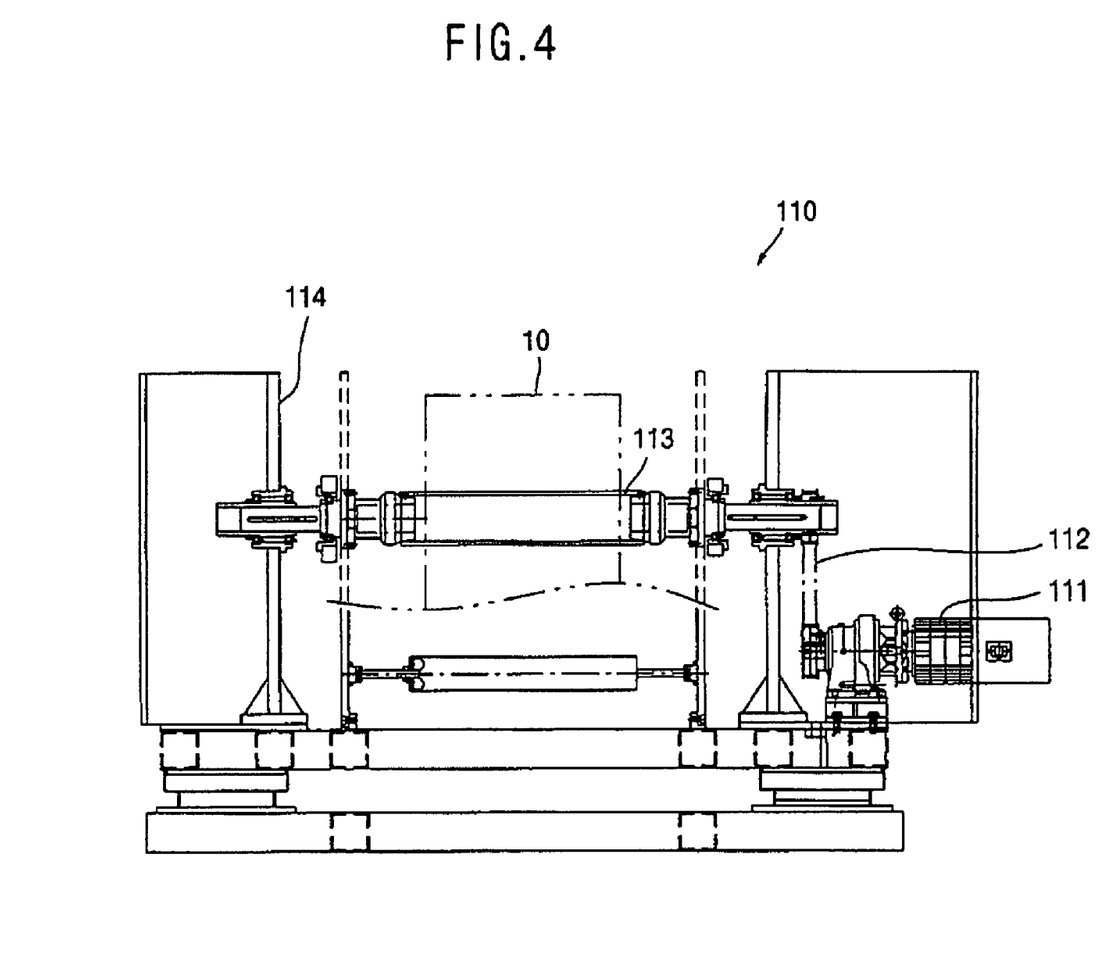
FIG. 4 is a side view showing a supplying section in the apparatus shown in FIGS. 3A and 3B for laminating tape on the electrode of the rechargeable battery.

Referring to FIGS. 1, 2, and 4, the supplying section 110 has an electrode 10 wound several times in a roll shape. The supplying section 110 plays the role of supplying the electrode 10 to the remainder of the apparatus at a constant rate. Active materials 12 are coated at predetermined distances from each other on the surfaces of a current collector 11, as described above. The layers formed with the active material 12 each have an end portion 13 with a step portion. More specifically, the supplying section 110 is provided with an electric motor 111 mounted on a side thereof and a roller 113 connected by a belt 112 to the electric motor 111. The roller 113 is supported by a support frame 114, and the electrode 10 is wound several times around the roller 113. When the electric motor 111 operates, the belt 112 rotates in a direction so as to enable the roller 113 to rotate in an identical direction, thereby unraveling the electrode 10 wound on the roller 113 at a desired rate.

Next, referring again to FIG. 3A, the first buffering section 120 conveys the electrode from the supplying section 110 at the constant rate, while collecting the electrode 10 for a desired time. More specifically, the first buffering section 120 includes an electric motor 121 mounted on a side thereof, a conveying roller 123 connected by a belt 122 to the electric motor 121, and a friction roller 124 being in close contact with the conveying roller 123 so as to have the electrode 10 interposed between the conveying roller 123 and the friction roller 124. When the electric motor 121 operates, the belt 122 rotates in a direction and the conveying roller 123 and the friction roller 124 also rotate in an identical direction, thereby applying a desired tension to and conveying the electrode 10 interposed between the conveying roller 123 and the friction roller 124 toward a laminating section 130.

Further, the first buffering section 120 is provided with a supporting roller 125 mounted at a rear portion thereof and having the same height as the conveying roller 123, so as to support and convey the electrode 10 toward the laminating section 130. An elevating roller 126 is disposed between the conveying roller 123 and the supporting roller 125, and is able to ascend and descend in a predetermined range. Here, the electrode 10 moves below the elevating roller 126. That is, the elevating roller 126 supports the electrode 10 moving along a peripheral surface of the elevating roller 126. While the laminating section 130 laminates tape 15 on the electrode 10, i.e. the electrode 10 stops moving in the laminating section 130, the elevating roller 126 descends downward due to its weight. At this time, the electrode 10 descends for a predetermined distance along with the elevating roller 126 because the electrode 10 contacts the peripheral surface of the elevating roller 126. In other words, since the electric motors 111 and 121 of the supplying section 110 and the first buffering section 120 continuously operate, the electrode 10 is continuously conveyed by means of the conveying roller 123 and the friction roller 124. However, since the electrode 10 stops its movement in the laminating section 130, i.e. in a state that the electrode 10 is laminated with the tape 15, the elevating roller 126 descends due to its weight while collecting the electrode 10 passing through the conveying roller 123 and the friction roller 124 for a constant time. In addition, when the electrode 10 is conveyed again in the laminating section 130, tension is applied to the electrode 10 between the conveying roller 126 and the supporting roller 125, so that the elevating roller 126 supporting the electrode 10 ascends upward. Of course, this operation causes the electrode 10 to rapidly and accurately move by a desired distance toward the laminating section 130.

Then, referring again to FIGS. 1-3B, the laminating section 130 stops the movement of the electrode 10 from the first buffering section 120 for a desired time and then laminates the tape 15 on the end portion 13 of the active material layer 12 formed on the electrode 10. More specifically, the laminating section 130 includes a lower tape laminating section 131a and an upper tape laminating section 131b.

Since the lower tape laminating section 131a laminates the tape 15 on two end portions of the active material layer formed on a lower surface of the electrode 10, the lower tape laminating section 131a has two supporters 132a disposed at a predetermined distance from each other at an upper portion thereof and a pressing element 133a disposed below the supporters 132a. The electrode 10 passes between the supporters 132a and the pressing element 133a. Further, a vision assembly 135a is mounted on the pressing element 133a so as to take a picture of the end portion of the lower active material layer of the electrode 10 and to compare the end portion of the electrode 10 with a reference position 17. Furthermore, the pressing element 133a has a cylinder 134a mounted thereon in order to elevate the pressing element 133a toward the supporters 132a and to laminate the tape 15 on the end portion of the active material layer. Of course, the supporters 132a may respectively have a cylinder mounted thereon to make the supporters 132a descend toward the pressing element 133a.

Figure 5A:
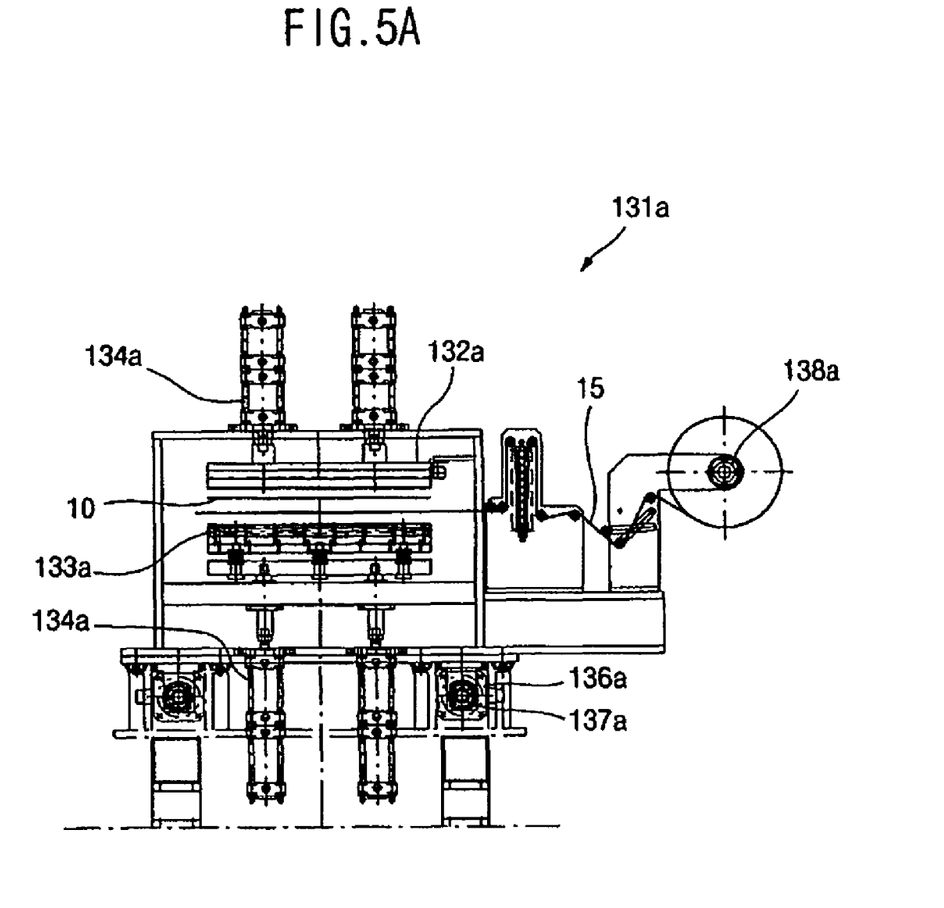
FIGS. 5A and 5B are side views showing a laminating section in the apparatus shown in FIGS. 3A-4 for laminating tape on the electrode of the rechargeable battery.

The tape 15 is supplied in a direction perpendicular to the conveying direction of the electrode 10. More specifically, as shown in FIG. 5A with reference to FIGS. 1, 2, and 3B, a roller 138a, on which the tape 15 is wound, is disposed adjacent to the supporters 132a and the pressing element 133a, and a leading end of the tape 15 is guided by means of a robot from the roller 138a in a direction perpendicular to the conveying direction of the electrode 10. After the tape 15 is guided, each cylinder 134a mounted on the supporters 132a and the pressing element 133a operates and enables the pressing element 133a to compress and laminate the tape 15 on the end portion 13 of the active material layer 12 while the supporters 132a support the upper portion of the electrode 10. In addition, after laminating the tape, a separate cutter (not shown) operates to cut the tape 15 in a region corresponding to the width of the electrode 10. That is, the tape cutter is mounted in the region corresponding to the width of the electrode 10, although not shown.

In addition, an electric motor 136a is disposed adjacent to a lower portion of the pressing element 133a. A ball screw 137a is mounted on the electric motor 136a and coupled to the pressing element 133a. In the lower tape laminating section 131a, when the vision portion 135a (FIG. 3A) takes a picture of the end portion 13 of the active material 12 and detects the eccentricity of the end portion from the reference position, the electric motor 136a operates and enables the pressing element 133a to move along the ball screw 137a to a predetermined position, so that the position of the pressing element 133a is corrected. This correction relating to the position of the pressing element is performed before the laminating of the tape.

Figure 5B:
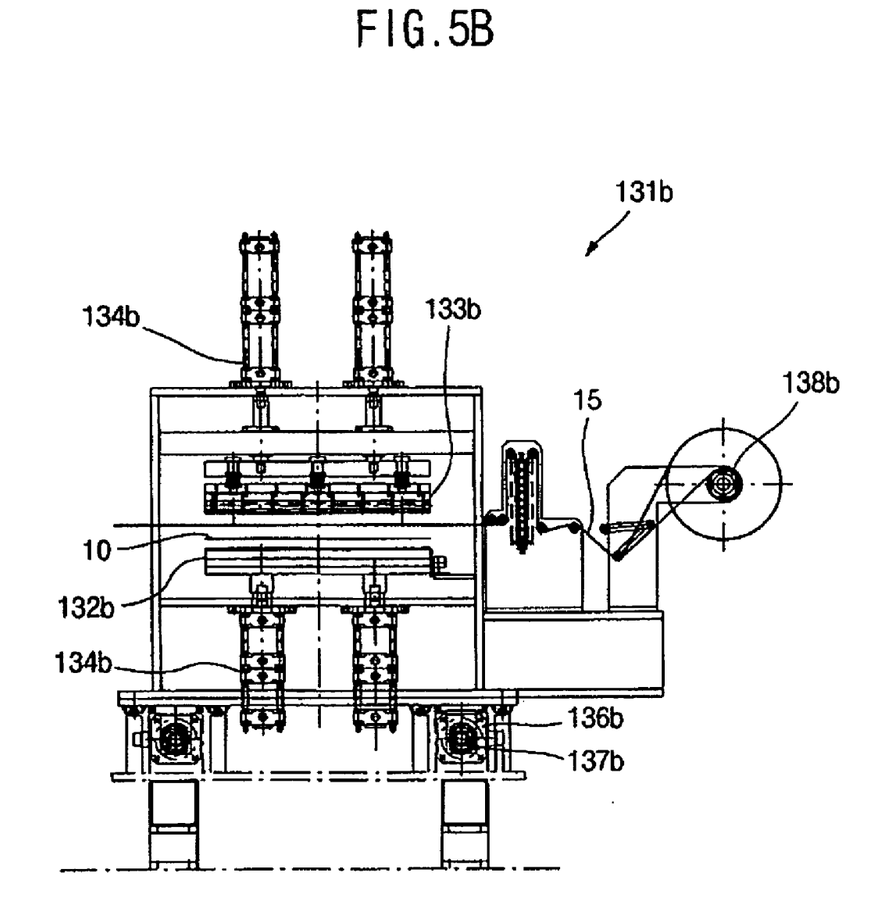

As shown in FIG. 5B with reference to FIGS. 1 and 2, the upper laminating section 131b includes two supporters 132b disposed at a lower portion thereof and pressing elements 133b respectively located over each supporter 132b, which laminate the tape 15 on two regions of the upper surface of the electrode 10. The electrode 10 passes between the supporter 132b and the pressing element 133b. Further, a vision portion 135b (FIG. 3A) is mounted on each pressing element 133b in order to take a picture of the end portion 13 of the active material layer 12 on the upper surface of the electrode 10 and to compare the position of the end portion 13 to a reference position. In addition, cylinders 134b are mounted on the pressing element 133b and the supporter 132b in order to keep the pressing element 133b and the supporter 132b close to each other and to laminate the tape 15 on the end portion 13 of the active material 12. The tape 15 is supplied in a direction perpendicular to the conveying direction of the electrode 10.

More specifically, a roller 138b having the tape 15 wound thereon is disposed near the supporter 132b and the pressing element 133b. The leading end of the tape 15 is guided by a robot (not shown) in a direction perpendicular to conveyance of the electrode 10. After the tape 15 is guided as described above, the cylinders 134b mounted on the supporter 132b and the pressing element 133b operate, so that the pressing element 133b presses and laminates the tape 15 to the end portion 13 of the active material layer 12 while the supporter 132b supports the lower surface of the electrode 10. Further, after the tape is laminated, a separate cutter (not shown) operates so as to cut the tape 15 in a region corresponding to the width of the electrode 10. Although not shown, the tape cutter is disposed in the region corresponding to the width of the electrode 10.

In addition, an electric motor 136b is disposed at a lower portion of the supporter 132b, while a ball screw 137b is mounted on the electric motor 136b and coupled to the supporter 132b. In the upper tape laminating section 131b, thus, when the vision portion 135b (FIG. 3A) takes a picture of the end portion of the active material layer 12 and detects the eccentricity of the end portion from the reference position, the electric motor 136b operates so that the supporter 132b moves along the ball screw 137b to a predetermined position. Here, the movement of the supporter 132b is performed before the tape is laminated.

Referring again to FIGS. 3A and 3B, the feeding section 140 conveys the electrode 10 from the laminating section 130 by a predetermined pitch. Specifically, the feeding section 140 has an electric motor 141 mounted thereon. A feeding roller 143 is connected by a belt 142 to the electric motor 141 so as to rotate and to feed the electrode 10 by the predetermined pitch. Further, a friction roller 144 is in contact with the feeding roller 143 with the electrode 10 interposed between the friction roller 144 and the feeding roller 143. In the feeding section 140 constructed as described above, when the motor 141 operates, the feeding roller 143 rotates so as to feed the electrode 10 of the laminating section 130 to the feeding section 140 by the predetermined pitch.

An inspecting section 145 is mounted in the feeding section 140 in order to detect the position of the tape laminated on the upper and lower surfaces of the electrode 10. Specifically, an upper camera 145a is disposed at an upper portion of the feeding section after the feeding roller 153 and the friction roller 154 in order to inspect the state of the tape laminated on the upper surface of the electrode 10, while a lower camera 145b is disposed at a lower portion of the feeding section after the feeding roller 153 and the friction roller 154 in order to inspect the state of the tape laminated on the lower surface of the electrode 10. Therefore, when the inspecting section 145 determines that the tape is improperly laminated, all structural elements stop their operation so that an operator can identify whether or not there exists an abnormality in the laminating apparatus.

Next, the second buffering section 150 conveys the electrode 10 from the feeding section 140 and the inspecting section 145 at a constant rate, while delaying the movement of the electrode 10 for a desired time. Specifically, the second buffering section 150 has an electric motor 151 mounted therein and a conveying roller 153 connected by a belt 152 to the electric motor 151. The conveying roller 153 is in contact with a friction roller 154 in a state that the electrode 10 is interposed between the conveying roller 153 and the friction roller 154. When the electric motor 151 operates, the conveying roller 153 and the friction roller 154 rotate in a direction so as to provide a tension to the electrode 10 interposed between the conveying roller 153 and the friction roller 154 while conveying the electrode 10 to a winding section 160.

A supporting roller 155 having an identical height with the conveying roller 153 is further mounted in front of the conveying roller 153 so as to support and convey the electrode 10 between the conveying roller 153 and the friction roller 154. Further, an elevating roller 156 is mounted between the supporting roller 155 and the conveying roller 153, which can ascend and descend in a range of the desired height. Here, the electrode 10 passes below the elevating roller 156. Specifically, the elevating roller 156 is supported by the electrode 10. During the laminating of the tape in the laminating section 130 (i.e. the movement of the electrode 10 is stopped in the laminating section 130), the elevating roller 156 ascends upward due to the tension of the electrode 10. At this time, since the peripheral surface of the elevating roller 156 is in contact with the electrode 10, the electrode 10 ascends along with the elevating roller 156 to the desired height. In other words, as the electronic motor 151 of the second buffering section 150 continues to operate, the conveying roller 153 and the friction roller 154 can continuously convey the electrode 10. However, since the movement of the electrode 10 is stopped in the laminating section 130 (i.e. the tape is laminated on the electrode 10), the elevating roller 156 ascends due to the tension of the electrode 10, thereby suitably conveying the electrode 10 to the winding section 160. On the other hand, when the electrode 10 is conveyed again in the laminating section 130, i.e. the feeding section 140 feeds the electrode 10, the tension of the electrode 10 between the supporting roller 155 and the conveying roller 153 becomes lower. Furthermore, the elevating roller 156 also descends due to its weight, thereby delaying the movement of the electrode 10 for a predetermined time. Thus, the winding section 160 receives the stable electrode 10 with the constant tension.

Finally, the winding section 160 winds the electrode 10 thereon in a roll shape. The tape is laminated on the end portions of the active material layers on the upper and lower surfaces of the electrode 10 as described above. The structure of the winding section 160 will be described in more detail. The winding section 160 has an electric motor 161 mounted therein and a winding roller 163 connected by a belt 162 to the electric motor 161. The electrode 10 is wound on the winding roller 163 several times. Therefore, when the electric motor 161 operates, the belt 162 rotates in a direction so as to enable the winding roller 163 to rotate in an identical direction with the belt 162, so that the electrode 10 is wound on the winding roller 163 at a predetermined rate.

Hereinafter, the operation of the apparatus 100 for laminating the tape on the electrode for the rechargeable battery according to an embodiment the present invention will be described with reference to FIGS. 1-5B.

In the apparatus 100 for laminating the tape on the electrode for the rechargeable battery according to this embodiment of the present invention, the electrode 10 is conveyed along the supplying section 110, the first buffering section 120, the laminating section 130, the feeding section 140, the second buffering section 150 and the winding section 160. The operation of each section in the tape laminating apparatus 100 will be described in order.

First, the supplying section 110 supplies the electrode 10, in which the active materials 12 are coated at a desired pitch and a desired area on the current collector 11, at a predetermined rate. Specifically, when the electric motor 111 operates, the belt 112 rotates in a direction so as to enable the supplying roller 113 to rotate in the identical direction with the belt 112, so that the electrode 10 wound on the supplying roller 113 can be supplied at the desired rate.

The electrode 10 supplied from the supplying section 110 has a desired tension caused by the first buffering section 120. The electrode 10 is not moved to the laminating section 130 for a predetermined time. Specifically, when the electric motor 121 operates, the belt 122 rotates in a direction so as to enable the conveying roller 123 and the friction roller 124 to rotate in the identical direction with the belt 122, so that the electrode 10 interposed between them moves in a direction. Thus, the tension of the electrode 10 is kept between the supplying roller 113 of the supplying section 110 and the conveying roller 123.

While the laminating of the tape is performed in the laminating section 130, the movement of the electrode 10 in the laminating section 130 is temporarily stopped. At this time, the elevating roller 126 descends downward due to its weight. Of course, since the peripheral surface of the elevating roller 126 contacts the electrode 10, the electrode 10 descends along with the elevating roller 126 to a desired distance. In other words, as the electric motor 111 of the supplying section 110 and the electric motor 121 of the first buffering section 120 continue to operate, the electrode 10 is continuously conveyed by the conveying roller 123 and the friction roller 124. However, since the movement of the electrode 10 is stopped in the laminating section 130 (i.e. the tape 15 is laminated on the electrode 10), the elevating roller 126 descends due to its weight and delays the movement of the electrode 10, which has passed between the conveying roller 123 and the friction roller 124, for a predetermined time. In addition, when the electrode 10 is conveyed again in the laminating section 130, the electrode 10 located between the elevating roller 126 and the laminating section 130 is subjected to the tension. As a result, the elevating roller 126 contacting the electrode 10 ascends upward due to the tension of the electrode 10. This operation causes the electrode 10 to rapidly and accurately move by a predetermined length to the laminating section 130.

In the laminating section 130, the tape 15 is laminated at a desired region on the electrode 10 supplied from the first buffering section 120. Specifically, the tape 15 is laminated on two end portions 13 of the active material layer 12 on the lower surface of the electrode 10 and on two end portions 13 of the active material layer 12 on the upper surface of the electrode 10. More specifically, the laminating section 130 includes the lower tape laminating section 131a and the upper tape laminating section 131b. In the lower tape laminating section 131a, the tape 15 is laminated on the end portions 13 of the lower active material layer 12. In the upper tape laminating section 131b, the tape 15 is laminated on the end portions 13 of the upper active material layer 12. In the lower tape laminating section 131a, first, the robot moves the tape 15 by the predetermined distance from the tape roller 138a mounted at a side of the supporter 132a and the pressing element 133a in order for the tape 15 to be perpendicular to the electrode 10. Then, each cylinder 134a mounted on the supporter 132a and the pressing element 133a operates to make the pressing element 133a compress and laminate the tape 15 to the end portions of the active material layer 12 of the electrode 10 while the supporter 132a supports the electrode 10. In addition, after the tape 15 is laminated on the electrode 10, the cutter operates to cut the tape 15 in the region corresponding to the width of the electrode 10.

Here, the lower tape laminating section 131a actually operates after the vision portion 135a, the electric motor 136a, and the ball screw 137a are operated. Specifically, when the vision portion 135a takes the picture of the end portion 13 of the active material layer 12 formed on the lower surface of the electrode 10 and determines that the end portion 13 of the active material layer 12 is away from the reference position, the electric motor 136a is operated so that the pressing element 133a moves along the ball screw 137a to the desired position so as to correct its position. In other words, when the end portion 13 of the active material layer 12 formed on the lower surface of the electrode 10 is accurately positioned in the predetermined region between the supporter 132a and the pressing element 133a, the lower tape laminating section 131a operates.

Next, in the upper tape laminating section 131b, the robot guides the tape 15 with the predetermined length from the tape roller 138b mounted at a side of the supporter 132b and the pressing element 133b in order for the tape 15 to be perpendicular to the electrode 10. Then, each cylinder 134b mounted on the supporter 132b and the pressing element 133b is operated, the upper pressing element 133b compresses and laminates the tape 15 to the end portion 13 of the active material layer 12 in the state that the supporter 132b supports the lower surface of the electrode 10. In addition, the cutter operates so as to cut the tape 15 in the region corresponding to the width of the electrode 10 after the tape 15 is laminated on the end portion 13.

Here, the upper tape laminating section 131b actually operates after the vision portion 135b, the electric motor 136b, and the ball screw 137b are firstly operated. Specifically, when the vision portion 135b takes the picture of the end portion 13 of the active material layer 12 formed on the upper surface of the electrode 10 and determines that the end portion 13 is away from the reference position, the electric motor 136b operates so that the pressing element 133b moves along the ball screw 137b to the desired position so as to correct its position. In other words, the upper tape laminating section 131b operates in the state that the end portion 13 of the active material layer 12 formed on the upper surface of the electrode 10 is exactly positioned between the supporter 132b and the pressing element 133b.

The electrode 10 having the tape 15 attached thereto is fed by a predetermined pitch from the feeding section 140 to the second buffering section 150. Specifically, when the electric motor 141 operates, the feeding roller 143 also operates so as to move the electrode 10 from the laminating section 130 by the predetermined pitch. On the other hand, the feeding section 140 further includes the inspection section 145 mounted therein. The inspection section 145 examines whether the tape 15 is laminated at an exact position and in an exact shape on the end portion 13 of the active material layer 12 or not. Specifically, the upper camera 145a examines the tape 15 laminated on the end portion 13 of the upper active material layer 12, while the lower camera 145b examines the tape 15 laminated on the end portion 13 of the lower active material layer 12. As the result, when the inspection section 145 determines that the laminating state of the tape 15 is imperfect, all structural elements stop their operations so that the operator can understand the abnormal operation of each section.

After the completion of feeding and examining the electrode 10, the electrode 10 with the constant tension is conveyed from the second buffering section 150 to the winding section 160 at the desired rate, while the supply of the electrode 10 is delayed for the predetermined time. Specifically, when the electric motor 151 operates, the belt 152 rotates in a direction while the conveying roller 153 and the friction roller 154 also rotate in a different direction from each other, thereby conveying the electrode 10, which has the predetermined tension and is interposed between the conveying roller 153 and the friction roller 154, to the winding section 160.

In addition, while the tape 15 is laminated in the laminating section 130 (i.e. the electric motor 141 of the feeding section 140 stops its operation), the elevating roller 156 ascends upward due to the tension of the electrode 10. In other words, as the electric motor 151 of the second buffering section 150 continuously operates, the electrode 10 is continuously carried by means of the conveying roller 153 and the friction roller 154. However, in the laminating section 130, as carrying of the electrode 10 is stopped (i.e. the tape 15 is laminated on the electrode 10), the elevating roller 156 suitably carries the electrode 10 to the winding section 160 while ascending due to the tension of the electrode 10. In addition, when the electrode 10 is carried from the laminating section 130 again, i.e. the feeding section 140 feeds the electrode 10, the tension of the electrode 10 between the supporting roller 155 and the conveying roller 153 is lower. Accordingly, the elevating roller 156 descends due to its weight while delaying the movement of the electrode 10 passing the supporting roller 155 for a predetermined time. As a result, the winding section 160 always can receive the stable electrode 10 with the constant tension.

Finally, the electrode 10 is wound on the winding section 160 to be in a roll shape. That is, when the electric motor 161 operates, the belt 162 rotates in a direction and the winding roller 163 also rotates in the same direction as the belt 162 so that the electrode 10 can be wound on the winding roller 163 at the predetermined rate.

As described above, the apparatus for laminating the electrode for the rechargeable battery according to the described embodiments of the present invention can automatically and accurately laminate the tape on the end portion of the active material layer which is a structural element of the electrode. Since the tape is laminated on the electrode as described above, it is possible to prevent the end portion of the active material layer of the electrode from extending through the separator so as to cause an electric short circuit in an electrode or active material having the polarity opposite to the electrode, thereby improving the safety and reliability of the rechargeable battery.

In the above-described embodiments of an apparatus for laminating the tape on the electrode for the rechargeable battery, on the other hand, even though the movement of the electrode is stopped by the laminating section for the predetermined time in the state that the supplying section and the winding section continuously operate, the first and second buffering sections are provided to delay the movement of the electrode for the predetermined time, thereby preventing the jam or the abnormal movement of the electrode.

Furthermore, the apparatus embodiments described above for laminating the tape on the electrode for the rechargeable battery are provided with the separate vision portion to be able to sense the end portion of the active material layer. Therefore, even if the end portion of the active material layer is away from the reference position, it is possible to correct the position of the end portion by using the electric motor and the ball screw, thereby accurately laminating the tape on the end portion of the active material layer.

Further, in the described embodiments, the feeding section is provided with the separate inspection section. Thus, the inspection section can detect that the tape is laminated at an abnormal position or inclined position on the electrode, thereby minimizing the inferiority of the tape laminating operation.

In addition, the above-described embodiments can constantly hold the tension of the electrode carried between the supplying section and the first buffering section using the conveying roller and the friction roller mounted in the first buffering section, while constantly holding the tension of the electrode carried between the second buffering section and the winding section using the conveying roller and the friction roller.

Although various embodiments of the present invention have been described for illustrative purposes, those skilled in the art will appreciate that various modifications, additions and substitutions are possible, without departing from the scope and spirit of the invention as disclosed in the accompanying claims and their equivalents.

What is claimed is:

1. An apparatus for laminating tape on an electrode for a rechargeable battery, the apparatus comprising:
   a supplying section for supplying the electrode at a constant rate, the electrode comprising a current collector having surfaces on which active materials are coated at distances from each other, the electrode being wound a plurality of times in a roll shape on the supplying section;
   a first buffering section for carrying the electrode from the supplying section at the constant rate;
   a laminating section for receiving the electrode from the first buffering section, the laminating section configured to laminate tape on end portions of the active materials after movement of the electrode is stopped in the laminating section and while the supplying section continuously supplies the electrode to the first buffering section at the constant rate;
   a feeding section for stopping the movement of the electrode for a predetermined time in the laminating section and conveying the electrode from the laminating section at a desired pitch, the feeding section stopping the movement of the electrode in the laminating section while the supplying section continuously supplies the electrode to the first buffering section at the constant rate;

a second buffering section for carrying the electrode from the feeding section and conveying the electrode at the constant rate; and a winding section for receiving the electrode from the second buffering section at the constant rate and winding the electrode in a roll shape, wherein the first buffering section comprises:
a first conveying roller for conveying the electrode from the supplying section;
a first supporting roller for supporting the electrode; and
a first elevating roller for delaying movement of the electrode,
wherein the first supporting roller is mounted at a rear portion of the first conveying roller, and the first elevating roller is mounted between the first conveying roller and the first supporting roller so as to descend due to a weight of the first elevating roller when movement of the electrode is stopped in the laminating section and to ascend due to tension of the electrode during feeding of the electrode in the feeding section, and wherein the second buffering section comprises:
a second conveying roller for conveying the electrode to the winding section;
a second supporting roller mounted in front of the second conveying roller for supporting the electrode; and
a second elevating roller mounted between the second supporting roller and the second conveying roller so as to ascend due to tension of the electrode when movement of the electrode is stopped in the laminating section and to descend due to a weight of the second elevating roller during the feeding of the electrode in the feeding section.

2. The apparatus as claimed in claim 1, wherein the supplying section comprises an electric motor and a supplying roller connected by a belt to the electric motor so as to rotate to supply the electrode at the constant rate.

3. The apparatus as claimed in claim 1, wherein the first buffering section further comprises:
an electric motor; and
a friction roller rotatable with the first conveying roller for controlling a tension of the electrode, the electrode being between and in contact with the first conveying roller and the friction roller,
wherein the first conveying roller is connected by a belt to the electric motor.

4. The apparatus as claimed in claim 1, wherein the laminating section comprises:
a lower tape laminating section for laminating the tape to the end portions of the active materials on a lower surface of the electrode; and
an upper tape laminating section for laminating the tape to the end portions of the active materials on an upper surface of the electrode.

5. The apparatus as claimed in claim 4, wherein the lower tape laminating section comprises:
a supporter disposed at an upper portion of the lower tape laminating section, for supporting the electrode;
a pressing element disposed at a lower portion of the lower tape laminating section, for laminating the tape; and
a vision portion mounted at a side of the pressing element, for detecting a position of the end portions of the active materials on the lower surface of the electrode.

6. The apparatus as claimed in claim 5, wherein the lower tape laminating section further comprises:
an electric motor mounted at the lower portion of the lower tape laminating section; and
a ball screw connected to the electric motor and coupled to the pressing element for controlling a position of the pressing element.

7. The apparatus as claimed in claim 4, wherein the upper tape laminating section comprises:
a supporter disposed at a lower portion of the upper tape laminating section, for supporting the electrode;
a pressing element disposed at an upper portion of the upper tape laminating section, for laminating the tape; and
a vision portion mounted at a side of the pressing element, for detecting a position of the end portions of the active materials.

8. The apparatus as claimed in claim 7, wherein the upper tape laminating section further comprises an electric motor mounted at the lower portion of the upper tape laminating section and a ball screw connected to the electric motor and coupled to the supporter for controlling a position of the supporter, 9. The apparatus as claimed in claim 1, wherein the feeding section comprises:
an electric motor;
a rotatable feeding roller connected by a belt to the electric motor, for feeding the electrode at the desired pitch; and
a friction roller rotatable with the feeding roller, the electrode being between and in contact with the feeding roller and the friction roller.

10. The apparatus as claimed in claim 9, wherein the feeding section further comprises an inspection section mounted at a rear portion of the feeding roller and the friction roller, for examining a position of the tape on the end portions.

11. The apparatus as claimed in claim 10, wherein the inspection section comprises:
a lower camera disposed at a lower portion of the inspection section for inspecting a position of the tape on a lower surface of the electrode; and
an upper camera disposed at an upper portion of the inspection section for inspecting a position of the tape on an upper surface of the electrode.

12. The apparatus as claimed in claim 1, wherein the second buffering section further comprises:
an electric motor; and
a friction roller for controlling a tension of the electrode, the electrode being between and in contact with the second conveying roller and the friction roller,
wherein the second conveying roller is connected by a belt to the electric motor.

13. The apparatus as claimed in claim 1, wherein the winding section comprises:
an electric motor; and
a rotatable winding roller connected by a belt to the electric motor, for receiving the electrode from the second buffering section and for winding the electrode thereon.

* * * * *

UNITED STATES PATENT AND TRADEMARK OFFICE
CERTIFICATE OF CORRECTION

PATENT NO. : 8,137,492 B2
APPLICATION NO. : 11/411429
DATED : March 20, 2012
INVENTOR(S) : Dong Ick Oh et al.

It is certified that error appears in the above-identified patent and that said Letters Patent is hereby corrected as shown below:

In the Claims

Column 14, Claim 8, line 26     Delete "supporter,"
                                Insert -- supporter. --

Signed and Sealed this
Twenty-fifth Day of February, 2014

Michelle K. Lee
*Deputy Director of the United States Patent and Trademark Office*